United States Patent
Nimura

(10) Patent No.: US 9,652,891 B2
(45) Date of Patent: May 16, 2017

(54) IMAGE CORRECTING APPARATUS, IMAGE CORRECTING METHOD AND STORAGE MEDIUM

(71) Applicant: CASIO COMPUTER CO., LTD., Shibuya-ku, Tokyo (JP)

(72) Inventor: Ryo Nimura, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/002,149

(22) Filed: Jan. 20, 2016

(65) Prior Publication Data
US 2016/0275659 A1 Sep. 22, 2016

(30) Foreign Application Priority Data

Mar. 18, 2015 (JP) ................................. 2015-054266

(51) Int. Cl.
*G06K 9/40* (2006.01)
*G06T 17/20* (2006.01)
*G06T 3/00* (2006.01)

(52) U.S. Cl.
CPC ............ G06T 17/20 (2013.01); G06T 3/0093 (2013.01)

(58) Field of Classification Search
CPC ..... G06T 17/20; G06T 3/0093; G06T 3/0031; G06K 2009/363; G06K 9/34
See application file for complete search history.

(56) References Cited

U.S. PATENT DOCUMENTS

2010/0259541 A1* 10/2010 Kitago .................... G06T 17/20
345/423
2013/0287319 A1* 10/2013 Yamamoto ............ G06T 3/0087
382/293
2014/0292802 A1 10/2014 Chen

FOREIGN PATENT DOCUMENTS

| JP | 62125470 A | 6/1987 |
| JP | 08087541 A | 4/1996 |
| JP | 2005045723 A | 2/2005 |
| JP | 2014192901 A | 10/2014 |

OTHER PUBLICATIONS

Japanese Office Action (and English translation thereof) dated Jan. 31, 2017 issued in Japanese counterpart Application No. 2015-054266.

* cited by examiner

*Primary Examiner* — Phuoc Tran
(74) *Attorney, Agent, or Firm* — Holtz, Holtz & Volek PC

(57) ABSTRACT

An image correcting apparatus includes an input unit and a processor. The input unit receives instruction inputs from a user. The processor performs processes including: displaying an image to be processed, and a mesh image superimposed on said corresponding image, on a display device; deforming a shape of the mesh image based on the instruction inputs; generating a conversion matrix representing coordinates after curvature correction of pixels constituting the image to be processed, based on the deformed shape of the mesh image; updating a recording matrix representing conversion histories of pixels constituting an original image, based on the coordinates represented by the generated conversion matrix; and performing curvature correction on the original image based on the updated recording matrix.

11 Claims, 11 Drawing Sheets

*FIG. 6*

MAP TABLE FOR CONVERSION 30

| y \ x | 0 | 1 | 2 | 3 | ... | M |
|---|---|---|---|---|---|---|
| 0 | (-1.2,2.4) | (0.2,3.6) | (2.2,2.8) | (3.5,3.1) | ... | |
| 1 | (-0.2,2.8) | (0.2,3.8) | (2.4,3.2) | (3.8,3.6) | ... | |
| 2 | (0.6,3.2) | (0.6,4.3) | (2.9,3.3) | (4.2,4.0) | ... | |
| 3 | (1.1,3.8) | (1.2,4.8) | (3.3,3.8) | (4.5,4.2) | ... | |
| ⋮ | ⋮ | ⋮ | ⋮ | ⋮ | ⋮ | ⋮ |
| N | | | | | | |

FIG. 8

MAP TABLE FOR RECORDING
(IMMEDIATELY BEFORE FIRST CORRECTION)                    31

| x\y | 0 | 1 | 2 | 3 | ... | M |
|---|---|---|---|---|---|---|
| 0 | (-1.2,2.4) | (0.2,3.6) | (2.2,2.8) | (3.5,3.1) | ... | |
| 1 | (-0.2,2.8) | (0.2,3.8) | (2.4,3.2) | (3.8,3.6) | ... | |
| 2 | (0.6,3.2) | (0.6,4.3) | (2.9,3.3) | (4.2,4.0) | ... | |
| 3 | (1.1,3.8) | (1.2,4.8) | (3.3,3.8) | (4.5,4.2) | ... | |
| ⋮ | ⋮ | ⋮ | ⋮ | ⋮ | ⋮ | ⋮ |
| N | | | | | | |

IMAGE CORRECTING APPARATUS, IMAGE CORRECTING METHOD AND STORAGE MEDIUM

CROSS-REFERENCE TO RELATED APPLICATION

This application is based upon and claims the benefit of priority from the prior Japanese Patent Application No. 2015-054266, filed on Mar. 18, 2015, and the entire contents of which are incorporated herein by reference.

BACKGROUND OF THE INVENTION

1. Field of the Invention

The present invention relates to an image correcting apparatus, an image correcting method, and a storage medium.

2. Description of the Related Art

There has been proposed a technology for imaging the pages of a book with a camera while turning the pages, without cutting off the binding of the book. In a case of opening a book in a natural state and imaging a page of the book from the top, since character strings and diagrams in the image are distorted due to the flexure of the page, it is difficult to read the character strings and the diagrams in the image.

For this reason, for example, in JP-A-2014-192901, there is proposed a technology for displaying a mesh image on a distorted image, and operating the mesh image according to the curvature of the plane of paper, thereby correcting the image distortion based on the mesh image.

However, in the technology according to the related art, in a case of performing an image correcting process once based on the mesh image, a good image may not be obtained by the designated mesh image. In this case, since it is required to adjust the mesh image with respect to the distorted image and perform correction once more, a time lag (a switching period) for updating with the processed image to be performed occurs. Alternatively, a method of displaying the mesh image on the already processed image obtained by correction and performing correction again can be considered. However, correction on the processed image causes the degree of image deterioration to increase.

SUMMARY OF THE INVENTION

An apparatus according to a first aspect of the present invention is an image correcting apparatus. The image correcting apparatus includes an input unit and a processor. The input unit receives instruction inputs from a user. The processor performs processes including: displaying an image to be processed, and a mesh image superimposed on said corresponding image, on a display device; deforming a shape of the mesh image based on the instruction inputs; generating a conversion matrix representing coordinates after curvature correction of pixels constituting the image to be processed, based on the deformed shape of the mesh image; updating a recording matrix representing conversion histories of pixels constituting an original image, based on the coordinates represented by the generated conversion matrix; and performing curvature correction on the original image based on the updated recording matrix.

A method according to a second aspect of the present invention is an image correcting method which includes: displaying an image to be processed, and a mesh image superimposed on said corresponding image, on a display device; receiving instruction inputs from a user; deforming a shape of the mesh image based on the instruction inputs; generating a conversion matrix representing coordinates after curvature correction of pixels constituting the image to be processed, based on the deformed shape of the mesh image; updating a recording matrix representing conversion histories of pixels constituting an original image, based on the coordinates represented by the generated conversion matrix; and performing curvature correction on the original image based on the updated recording matrix.

A computer-readable storage medium according to a third aspect of the present invention has stored thereon a program executable by a computer, the program controlling the computer to perform functions including: displaying an image to be processed, and a mesh image superimposed on said corresponding image, on a display device; receiving instruction inputs from a user; deforming a shape of the mesh image based on the instruction inputs; generating a conversion matrix representing coordinates after curvature correction of pixels constituting the image to be processed, based on the deformed shape of the mesh image; updating a recording matrix representing conversion histories of pixels constituting an original image, based on the coordinates represented by the generated conversion matrix; and performing curvature correction on the original image based on the updated recording matrix.

BRIEF DESCRIPTION OF THE DRAWINGS

It is possible to more deeply understand this application if considering the following description in conjunction with the following drawings.

FIG. 6 is a conceptual view illustrating an example of a conversion map table 30 according to the embodiment.

FIG. 8 is a conceptual view illustrating an example of a recording map table 31 (immediately before first correction) according to the embodiment.

DESCRIPTION OF THE PREFERRED EMBODIMENT

Hereinafter, an embodiment of the present invention will be described with reference to the accompanying drawings.

A. Configuration of Embodiment

Figure 1:
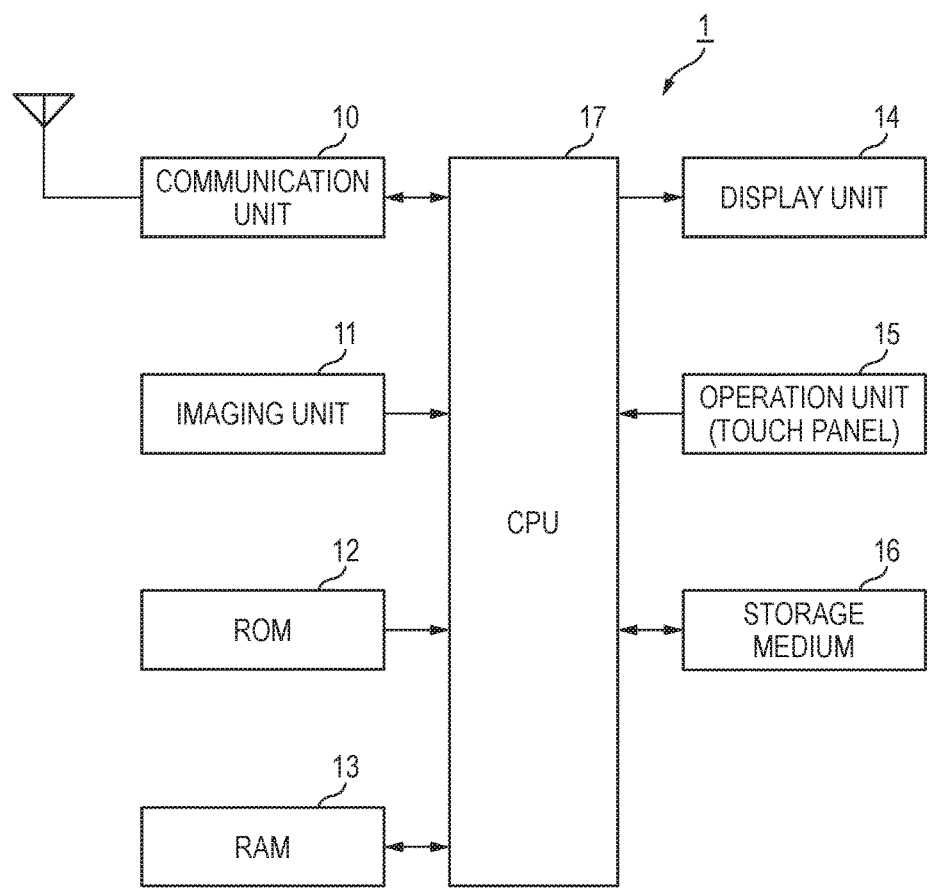
FIG. 1 is a block diagram illustrating the configuration of a portable information terminal 1 which is an image correcting apparatus according to an embodiment of the present invention.

FIG. 1 is a block diagram illustrating the configuration of a portable information terminal 1 which is an image correcting apparatus according to the embodiment of the present invention. In the drawing, the portable information terminal 1 is composed of, for example, a smart phone or a tablet terminal. The portable information terminal 1 includes a communication unit 10, an imaging unit 11, a ROM 12, a RAM 13, a display unit 14, an operation unit (a touch panel) 15, a storage medium 16, and a CPU (which may include operation unit such as a processor and so on) 17.

The communication unit 10 accesses a network such as the Internet, for example, by use of at least one of mobile communication, Bluetooth™, and a wireless LAN (WiFi). The imaging unit 11 is composed of a lens block composed of optical lens groups, and an imaging element such as a CCD and a CMOS, and images an image input from the lens block, by the imaging element. Especially, in the present embodiment, the imaging unit 11 images pages of books.

The ROM 12 retains programs executable by a CPU 17 (to be described below), various parameters necessary for operations and so on, and so forth. The RAM 13 stores temporal data which are obtained when the CPU 17 (to be described below) executes the programs, various application programs, and data such as various parameters necessary to execute applications. Especially, in the present embodiment, in the RAM 13, a conversion map table and a recording map table which are generated from a mesh image, and so forth are stored. The mesh image has a shape adjusted by user's operations based on an original image acquired by imaging a page of a book or a processed image obtained by curvature correction.

The recording map table and the conversion map table are matrixes representing post-correction pixel coordinates which are obtained from the mesh image in order to correct the curvature of the original image or the processed image. The conversion map table represents post-correction pixel coordinates which are obtained from the current mesh image, and the recording map table represents post-correction pixel coordinates obtained during previous conversion. The recording map table is updated based on the conversion map table whenever a curvature correcting process is performed, and is used to perform curvature correction on the original image based on the current mesh image. The details of the recording map table and the conversion map table will be described below.

The display unit 14 is composed of a liquid crystal display, an organic EL (electro luminescence) display, or the like, and displays icons linked with specific functions, applications, and so on, application screens, various menu screens, and so forth. The operation unit (a touch panel) 15 detects direct touches or proximity of fingers, a stylus (a pen), and the like. Also, the operation unit (a touch panel) 15 may include mechanical switches such as a power button and a volume button. Also, in the present embodiment, the operation unit (a touch panel) 15 can receive touch operations for designating the shape of the mesh image as a parameter for correcting the curve (distortion) of an acquired image. By those touch operations, a user adjusts the shape of the mesh image according to the shape of an image (an original image or a processed image after correction) of a page of a book.

The storage medium 16 saves a variety of data such as data on acquired images. The CPU 17 controls the operations of individual units by executing the programs retained in the ROM 12 described above. Especially, in the present embodiment, the CPU 17 performs curvature correction on acquired images by executing an image processing program.

The present embodiment is an assistive technology for making it easier for the user to set the parameter (the mesh image) for performing curvature correction on an image of a book or a brochure (hereinafter, referred to collectively as a book) taken with the imaging unit 11 or any other device having an imaging function. The CPU 17 superimposes a mesh image based on a mesh type on an original image or a processed image, such that the user can adjust the shape of the mesh image according to the original image or the processed image by user's operations.

Also, based on the adjusted mesh image, the CPU 17 generates a conversion map table 30 (to be described below) representing the movement destination coordinates of pixels at that moment, and a recording map table 31 (to be described below) representing how the coordinates of the pixels of the original image has been converted into those of a processed image. Whenever a curvature correcting process is performed, the CPU 17 updates the coordinates of the recording map table 31, thereby making it possible to repeatedly set the mesh image with respect to a processed image, and whenever updating is performed, the CPU converts the original image into a processed image, and displays the processed image. As a result, it becomes possible to repeatedly and smoothly perform a correcting process, without deteriorating the image.

B. Operation of Embodiment

Figure 2:
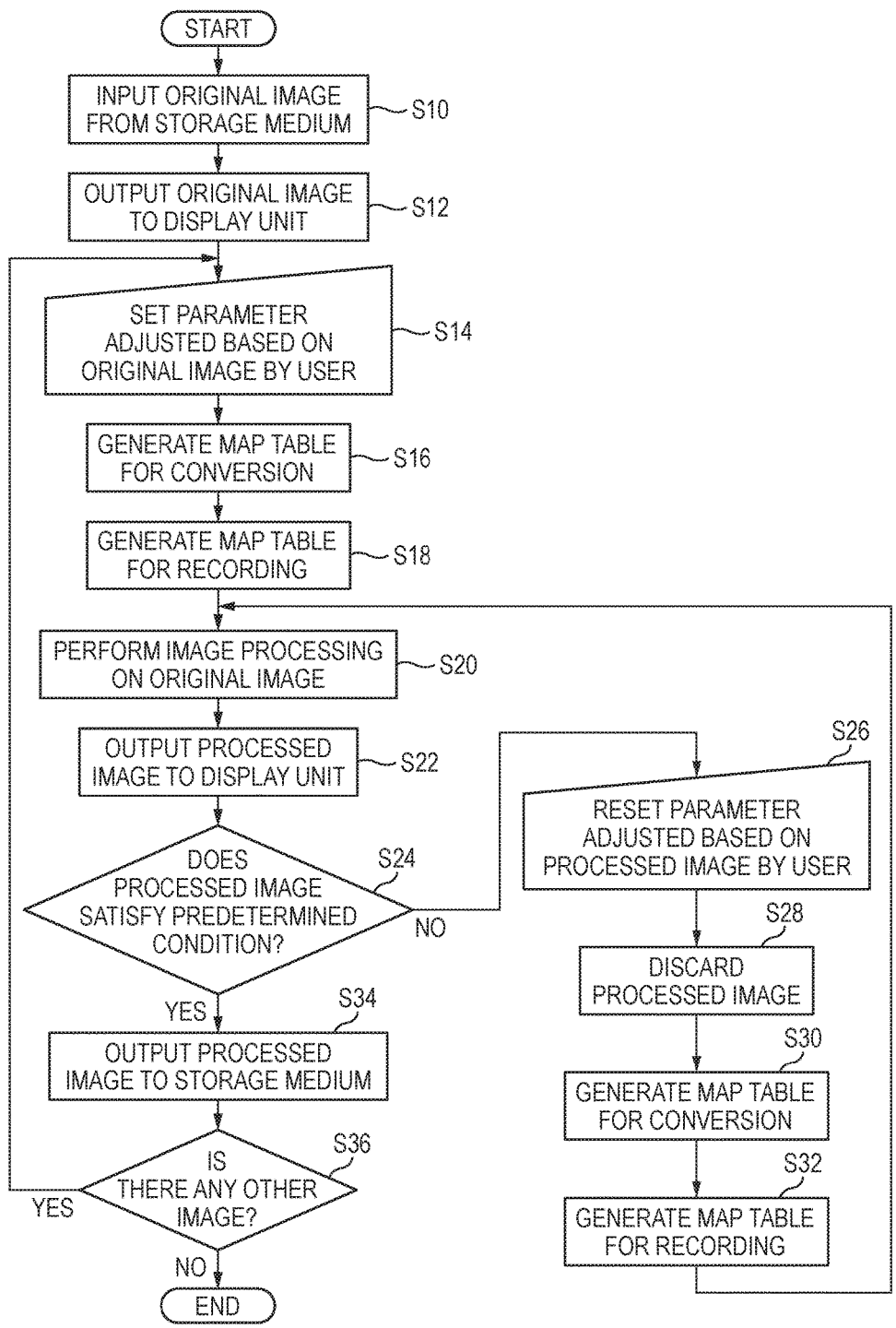
FIG. 2 is a flow chart for explaining the general operation of the portable information terminal 1 according to the embodiment.

Now, the operation of the above described embodiment will be described. FIG. 2 is a flow chart for explaining the general operation of the portable information terminal 1 of the present embodiment. In the portable information terminal 1, first, in STEP S10, the CPU 17 reads an original image of a page of a book from the storage medium 16 into the RAM 13. Then, in STEP S12, the CPU outputs the original image and an initial undistorted mesh image superimposed on the original image, on the display unit 14.

Figure 3:
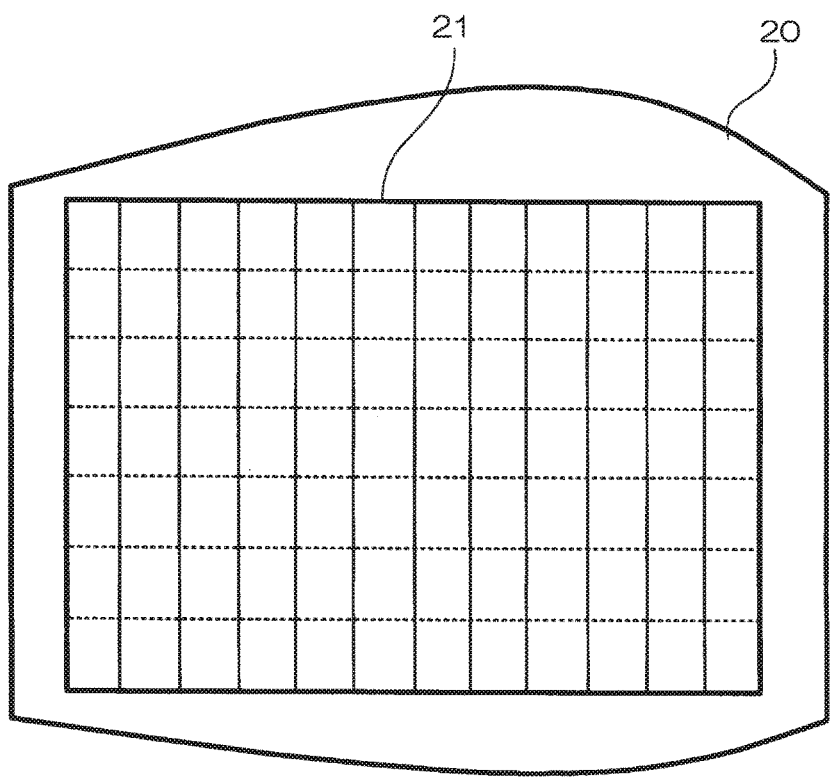
FIG. 3 is a schematic diagram illustrating an original image, and an initial undistorted mesh image superimposed on the original image.

FIG. 3 is a schematic diagram illustrating an original image and an initial undistorted mesh image superimposed on the original image according to the present embodiment. In STEP S12, an original image 20 and an undistorted mesh image 21 are displayed, as shown in FIG. 3. The original image is curved due to the curvature of the book during imaging. The mesh image 21 is drawn by an application executable by an installed platform. In a case where it is impossible to draw a mesh image by an application, any other known method may be used to synthesize an original image and a mesh image and display the synthetic image. Also, the mesh image 21 is composed of a plurality of areas (arranged in an m-by-n matrix). The details of the mesh image 21 will be described below.

Subsequently, in STEP S14, the CPU 17 sets a parameter (a mesh image shape) for curvature correction, according to information input from the operation unit (a touch panel) 15 based on the original image 20. The user can arbitrarily deform the mesh image by performing touch operations on the operation unit (a touch panel) 15. Besides user's touch operations, a separate algorithm (image recognition) may be used to automatically derive a mesh image. Hereinafter, a case where the user sets a mesh image shape will be described in detail.

Figure 4:
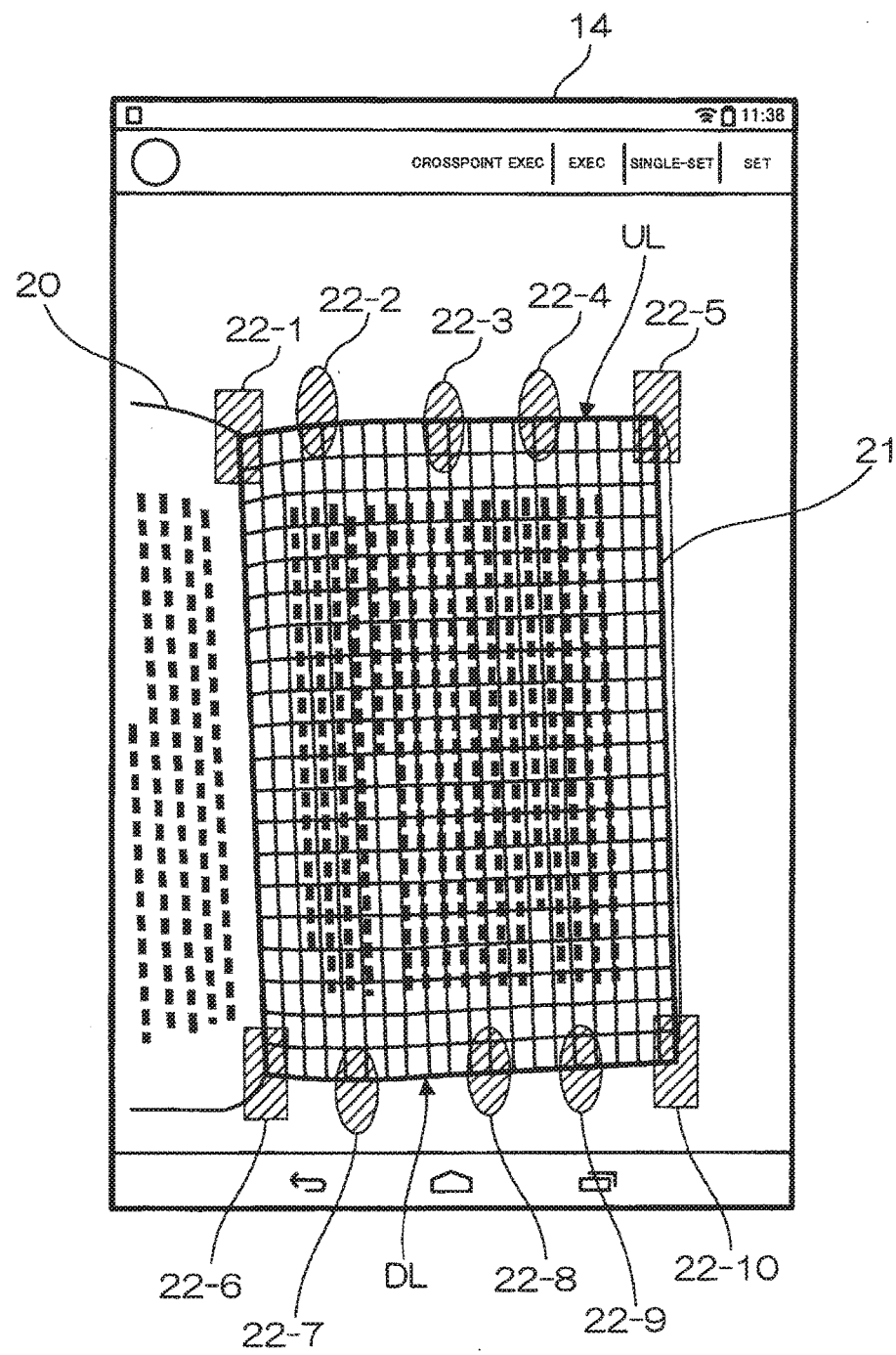
FIG. 4 is a schematic diagram illustrating a display state obtained by superimposing a mesh image 21 on an original image 20 according to the embodiment.
Figure 5:
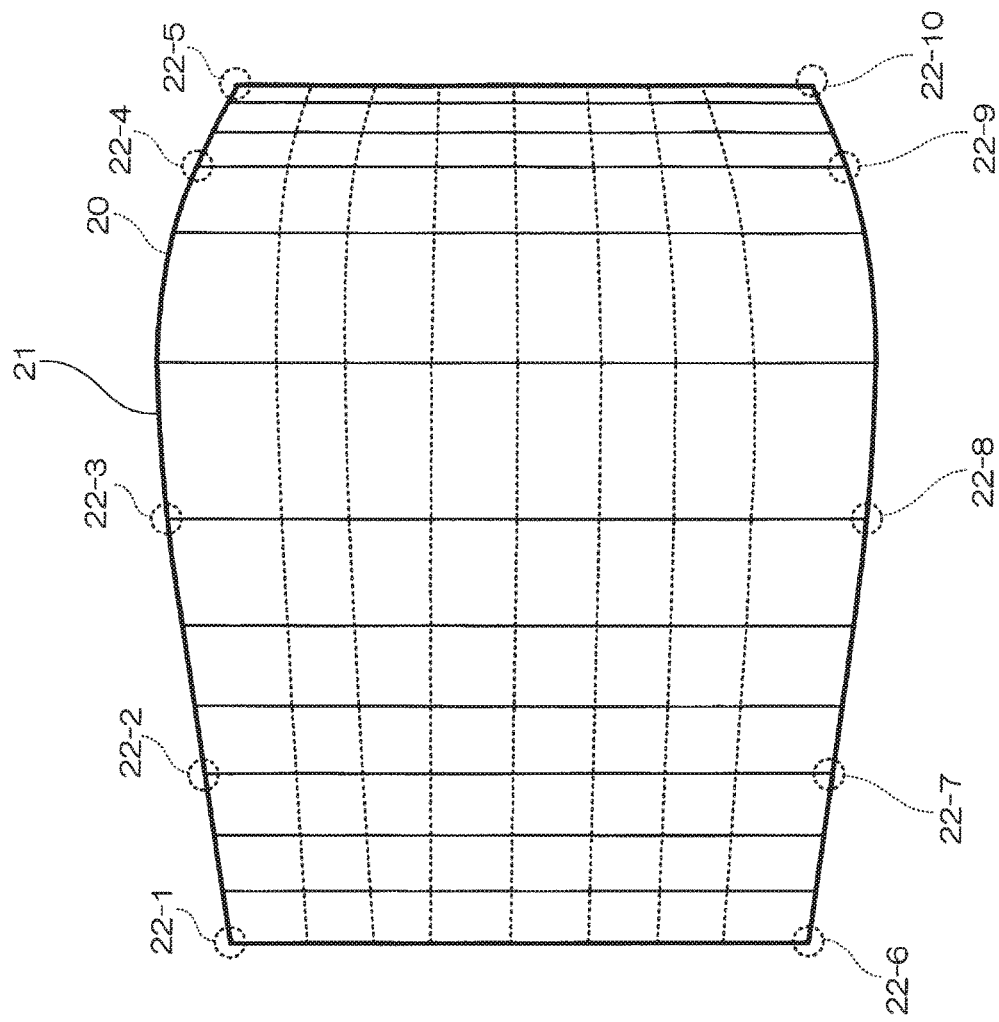
FIG. 5 is a schematic diagram for explaining control points of the mesh image 21 according to the present embodiment.

FIG. 4 is a schematic diagram illustrating a display state obtained by superimposing the mesh image 21 on the original image 20. Also, FIG. 5 is a schematic diagram for explaining control points of the mesh image 21 according to the present embodiment.

The user expands or contracts the shape of the mesh image 21 displayed on the original image 20 by touch operations, such that the mesh image shape is fitted to the shape of the curved original image 20 as shown in FIG. 4. As shown in FIGS. 4 and 5, the points of the mesh image 21 are control points 22-1 to 22-10 of Bezier curves, and can be moved by touch operations. If the user moves the control points 22-1 to 22-10 by touch operations, such that the shape of the mesh image 21 matches the shape of the original image 20, the shape of the whole mesh image 21 is deformed according to the touch operations.

An upper line UL and a lower line DL of the top and bottom of the mesh image 21 are drawn by quartic Bezier curves. Five control points 22-1 to 22-5 of the upper line UL and five control points 22-6 to 22-10 of the lower line DL can be moved, whereby it is possible to freely move the upper line UL and the lower line DL. The CPU 17 uses a predetermined mesh generating algorithm to derive the widths of transverse lines and longitudinal lines interposed between the upper line UL and the lower line DL, and the curvatures of the curves, and the like based on the upper line UL and the lower line DL, thereby deforming the shape of the mesh image 21 in real time.

Also, in the present embodiment, the total number of upper and lower control points 22-1 to 22-10 for deforming the mesh image 21 is 10. However, the number of control points is not limited thereto, and the intersections of the plurality of areas constituting the mesh image 21 may be set as control points. Also, the present embodiment may be configured such that, even if the user performs a touch operation on a desired point other than the points on the upper line UL or the lower line DL, an intersection included in a range including the touched point function as a control point for deformation. In this case, in order to show that the corresponding intersection is valid as a control point, the size of the dot of the corresponding intersection may be increased, or the color thereof may be changed. Further, in order to facilitate an operation for moving the corresponding intersection, the range including the touched point may be enlarged and displayed.

Subsequently, in STEP S16, based on the mesh image 21 which is deformed in real time, the CPU 17 generates a conversion map table for performing curvature correction on the original image 20. More specifically, the CPU generates a conversion map table corresponding to the mesh image 21 which is deformed in real time and representing post-conversion coordinates corresponding to the coordinates of all pixels of the original image 20 or a processed image 20a.

FIG. 6 is a conceptual view illustrating an example of the conversion map table 30 according to the present embodiment. In FIG. 6, the conversion map table 30 is a table containing the coordinates of all of pixels constituting the original image 20 and arranged in a matrix having the M number of columns in the transverse direction (x) and the N number of rows in the longitudinal direction (y). As an example of the record format, as shown in FIG. 6, the coordinates of the pixels of the original image 20 are represented by indexes of the matrix, and real numbers representing post-conversion coordinates of each pixel are stored as two components of a corresponding element of the matrix. In other words, in the conversion map table 30, post-conversion coordinates of all pixels of the original image 20 are recorded.

Figure 7:
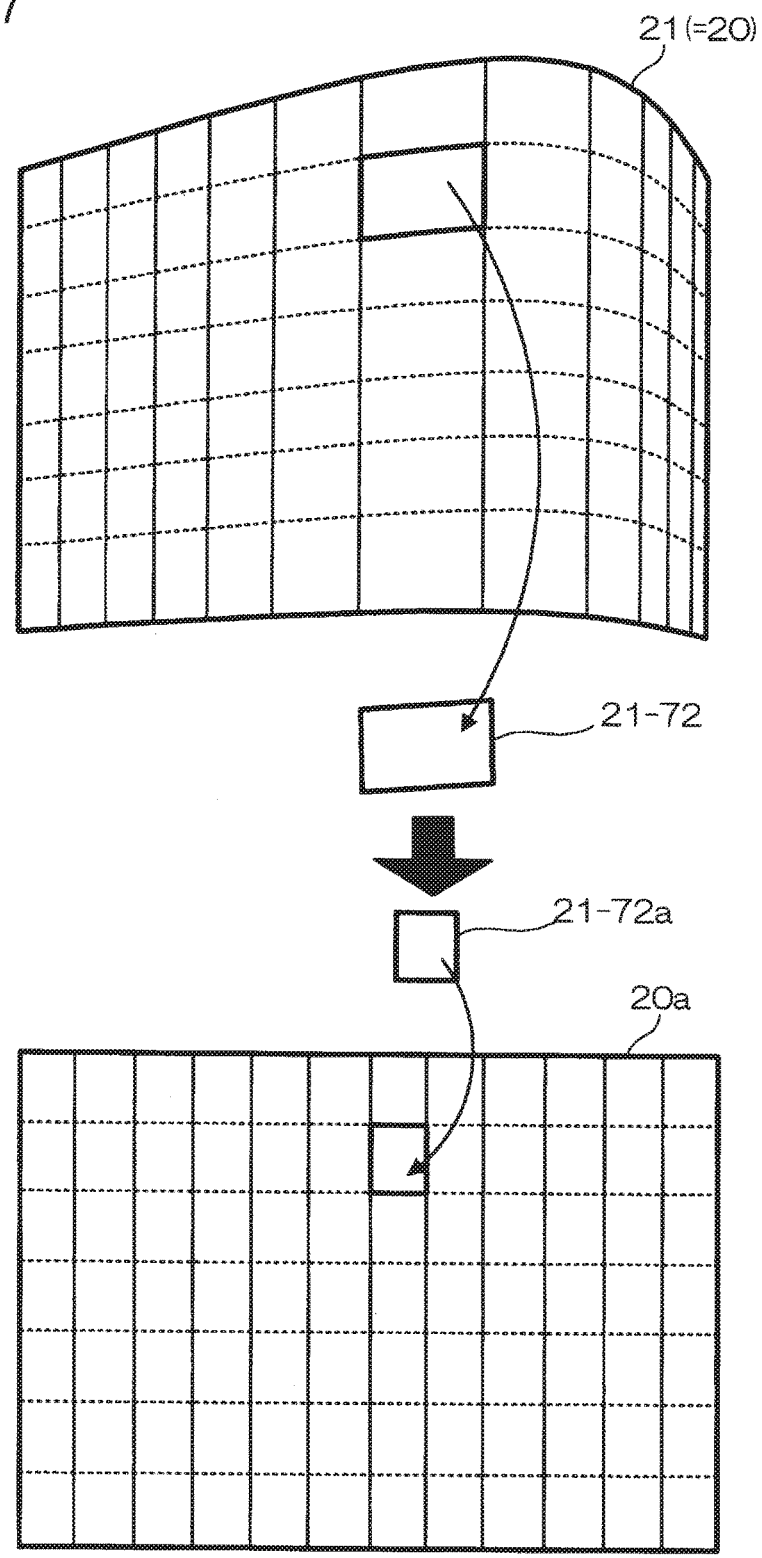
FIG. 7 is a conceptual view for explaining a method of generating the conversion map table 30 according to the embodiment.

FIG. 7 is a conceptual view for explaining the method of generating the conversion map table 30 according to the present embodiment. The mesh image 21 is composed of the plurality of areas as described above. Each area is composed of a small quadrilateral, and the vertexes of each quadrilateral are intersections of mesh. The CPU 17 divides the original image 20 into a plurality of areas as shown in the upper part of FIG. 7, according to the individual areas of the distorted mesh image 21. In other words, the mesh image 21 shown in FIG. 7 is almost the same as the original image 20. The distorted original image 20 is an image of a curved surface, and since partial areas constituting the curved surface were approximated to a plane, in the original image, the curve surface is shown in a polygonal shape. The shape of the mesh image 21 is deformed by touch operations such that it matches the shape of the original image 20. Therefore, the shape of each area also is deformed, for example, like an area 21-72 arranged in the seventh column and second row. In other words, each area is also deformed according to the curvature of the original image 20.

In the present embodiment, in order to perform distortion correction on all areas of the original image 20, a perspective conversion (trapezoid correction) technique of approximating each area to a trapezoid is used to acquire pixel post-conversion coordinates. As shown in the lower part of FIG. 7, all of the areas of the original image 20 after conversion have the same rectangular shape, and the correction of those areas is the processed image 20a after correction. For example, the area 21-72 in the seventh column and the second row is deformed into a rectangular shape like an area 21-72a. Since it is possible to associate the coordinates of the vertexes of each quadrangular area before conversion with the coordinates of the vertexes of a rectangle after conversion, it becomes possible to acquire the post-conversion coordinates of the pixels of the corresponding area, from the vertex coordinate correspondence relation.

The CPU 17 calculates where the pixels of the original image 20 will be moved by perspective conversion (trapezoid correction), according to the perspective conversion (trapezoid correction) technique, thereby deriving the post-conversion coordinates of the pixels of the original image 20. The conversion map table 30 shown in FIG. 6 is a table containing the pre-conversion coordinates (x, y) of the pixels of the original image 20 and the post-conversion coordinates of the pixels in association with each other. However, at the time of deriving the post-deformation coordinates, actual perspective conversion (trapezoid correction) is not performed.

Subsequently, in STEP S18, the CPU 17 generates a recording map table. At this moment, the above described conversion map table 30 may be deleted.

FIG. 8 is a conceptual view illustrating an example of the recording map table 31 (immediately before first correction) according to the present embodiment. As described above, the recording map table 31 is a table representing how the pixel coordinates of the original image 20 has been converted into the pixel coordinates of the processed image 20a after curvature correction. At this moment, since first curvature correction has not been performed, the recording map table 31 may be obtained by copying or renaming the conversion map table 30 generated in STEP S16.

Subsequently, in STEP S20, the CPU 17 performs curvature correction as image processing on the original image 20, with reference to the recording map table 31. In other words, the CPU 17 performs the above described perspective conversion (trapezoid correction) on the original image 20 with reference to the recording map table 31, thereby performing image conversion to move all pixels of the original image 20. An image obtained by the perspective conversion (trapezoid correction) is the processed image 20a If image processing finishes, in STEP S22, the CPU 17 outputs the processed image obtained by performing image processing, that is, the processed image 20a obtained by performing curvature correction based on the recording map table 31, and the mesh image 21 superimposed on the processed image 20a, on the display unit 14. Subsequently, in STEP S24, the CPU 17 determines whether the processed image 20a satisfies a predetermined condition.

In the present embodiment, the user recognizes the processed image 20a obtained by performing curvature correction and displayed on the display unit 14, and determines whether sufficient curvature correction has been performed or whether the degree of curvature correction is too high or too low, and issues an instruction to continue or finish curvature correction, using the operation unit (a touch panel) 15. However, the present invention is not limited thereto. The CPU 17 may determine whether distortion of the processed image 20a obtained by correction is within an allowable range, by image recognition, thereby determining whether the processed image satisfies the predetermined condition.

In a case where the processed image 20a does not satisfy the predetermined condition ("NO" in STEP S24), in STEP S26, the user resets the parameter (the shape of the mesh image 21) for curvature correction based on the processed image 20a, using the operation unit (a touch panel) 15. More specifically, in order to increase or decrease or partially adjust the degree of curvature correction, the user moves the control points 22-1 to 22-10 of the mesh image 21 displayed on the processed image 20a, by touch operations on the operation unit (a touch panel) 15, thereby changing the shape of the mesh image. The CPU 17 expands or contracts the mesh image 21 based on the movements of the control points 22-1 to 22-10 of the mesh image 21, like in the process of STEP S14 described above.

If the parameter (the shape of the mesh image 21) for curvature correction is reset, the CPU 17 discards the processed image 20a displayed on the display unit 14, in STEP S28, and generates a conversion map table 30 for curvature correction based on the newly set mesh image 21, in STEP S30, likely in STEP S16 described above. However, at this time, since the conversion map table 30 is generated based on the mesh image 21 set in STEP S26, it goes without saying that the content of the conversion map table is different from the content of the conversion map table 30 generated in STEP S16.

Subsequently, in STEP S32, the CPU 17 updates the recording map table 31. More specifically, the CPU 17 compares the pixel coordinates of the conversion map table 30 with the pixel coordinates of the recording map table 31 generated in STEP S18 described above, and updates the pixel coordinates of the recording map table 31 based on the pixel coordinates of the conversion map table 30. Since the pixel coordinates of the recording map table 31 are updated as described above, it is possible to perform coordinate conversion on a new processed image of the original image. Also, at this moment, the conversion map table 30 may be deleted.

Figure 9:
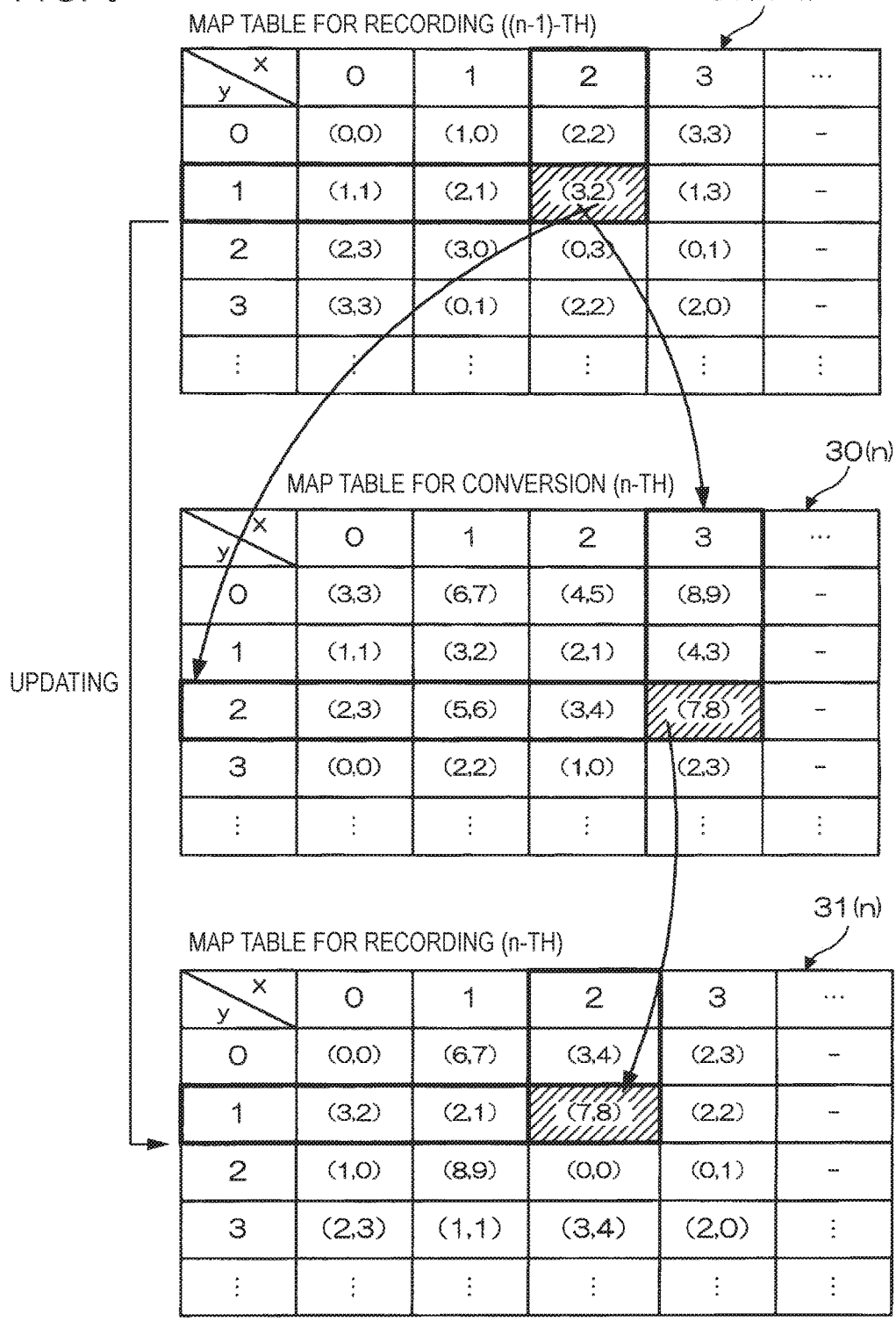
FIG. 9 is a conceptual view for explaining a process of updating the recording map table 31 according to the embodiment.

FIG. 9 is a conceptual view for explaining the process of updating the recording map table 31 according to the present embodiment. For ease of explanation, in FIG. 9, integers are shown as the values of the pixel coordinates. In FIG. 9, the upper part shows a recording map table 31(n−1) of previous curvature correction, and the middle part shows a current conversion map table 30(n), and the lower part shows an updated recording map table 31(n). On the assumption that current curvature correction is the n-th correction, and the previous curvature correction is the (n−1)-th correction, those numbers are written as suffixes of the reference symbols of the individual tables.

Updating of a recording map table 31 is performed as follows. The elements of the previous recording map table 31(n−1) represent the pixel coordinates before curvature correction. Meanwhile, the elements of the conversion map table 30(n) represent the pixel coordinates after curvature correction. Therefore, the coordinates of each pixel of the recording map table 31(n−1) moves to the coordinates of the current conversion map table 30(n) corresponding to the corresponding pixel.

For example, if the coordinates of a pixel in the second column and first row (x=2, y=1) of the previous recording map table 31(n−1) are (3, 2), the pixel (2, 1) moves to the coordinates in the third column and second row (x=3, and y=2) of the conversion map table 30(n), that is, the coordinates (7, 8) in the third column and second row (x=3, and y=2) of the conversion map table 30(n), by the current curvature correction.

In short, if curvature correction is performed on the original image based on the current mesh image 21 set with respect to a processed image 20a(n−1), the pixel (2, 1) moves to the coordinates (7, 8). Thereafter, the corresponding element of the recording map table 31(n−1) is replaced with the coordinates of the conversion map table, whereby the updated recording map table 31(n) is generated. This updating operation is performed on all elements of the recording map table 31(n−1), whereby the updated recording map table 31(n) is obtained.

In the example described above with reference to FIG. 9, for ease of explanation, integers are used as the elements of each table. However, since the elements of each table are real numbers, it is impossible to simply update each table. For this reason, in the present embodiment, the coordinates of each table are interpolated, whereby the recording map table 31 is updated. This will be described below in detail.

Figure 10:
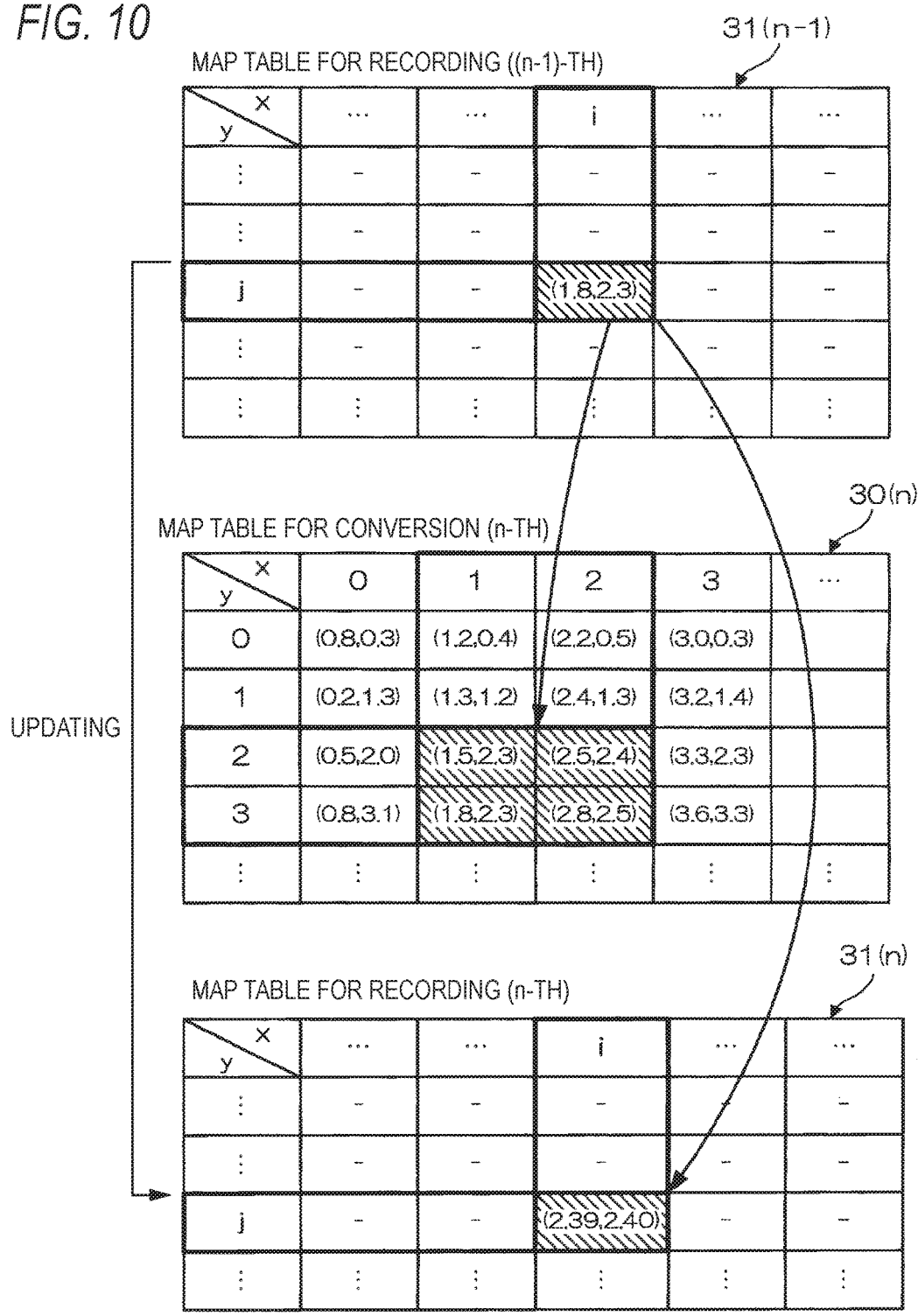
FIG. 10 is another conceptual view for explaining the process of updating the recording map table 31 according to the embodiment.

FIG. 10 is a conceptual view for explaining the process of updating the recording map table 31. Parts corresponding to those of FIG. 9 are denoted by the same reference symbols. In the present embodiment, in order to interpolate the coordinates of each table, a bilinear method is used. However, a bicubic method, an interpolation method usable in an image deforming process, or the like may be used, and the present invention is not particularly limited thereto.

If the coordinates of a pixel in the i-th column and j-th row (x=i, y=j) of the previous recording map table 31(n−1) is (1.8, 2.3), since the x coordinate "1.8" is between 1 and 2 and the y coordinate "2.3" is between 2 and 3, pixels in the vicinity of the corresponding coordinates (1.8, and 2.3) correspond to four elements in the first column and second row, the second column and second row, the first column and third row, and the second column and third row of the conversion map table 30(n) as shown in the middle part of the FIG. 9. Therefore, interpolation is performed on the x components and y components of the four elements by the bilinear method, whereby coordinates (2.39, 2.40) are obtained as the post-conversion coordinates of the coordinates (1.8, 2.3). In other words, the pixel (i, j) moves to the coordinates (2.39, 2.40) obtained by performing interpolation on the coordinates represented by the four elements of the conversion map table 30(*n*), by the current curvature correction.

Now, the bilinear method will be described in brief.

Figure 11:
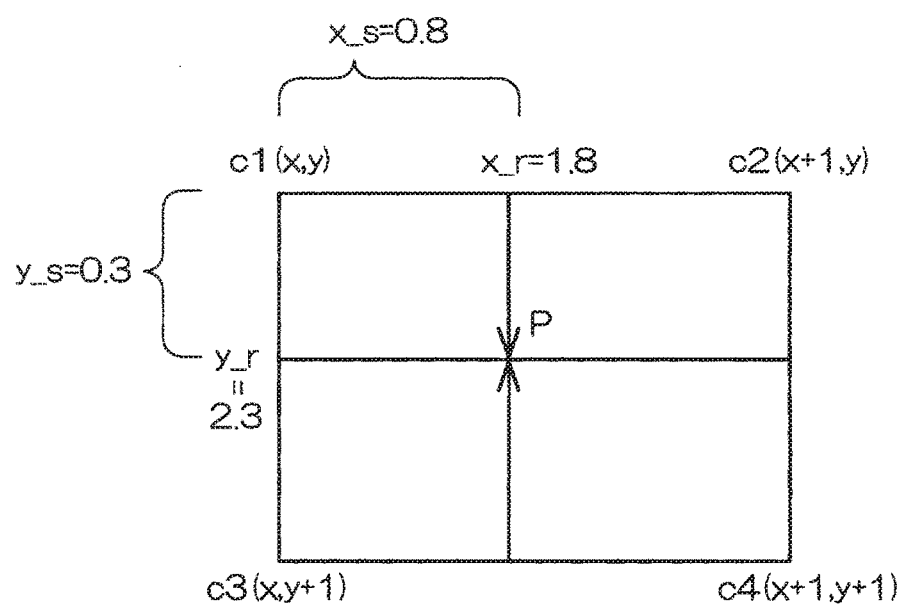
FIG. 11 is a conceptual view for explaining a bilinear method used in the process of updating the recording map table 31 according to the embodiment.

FIG. 11 is a conceptual view for explaining the bilinear method which is used in the process of updating the recording map table 31 according to the present embodiment. In the present embodiment, according to the coordinates (real numbers), linear coordinate interpolation is performed on the values of the coordinates of the surrounding four pixels by the bilinear method. The coordinates c1, c2, c3, and c4 shown in FIG. 11 are the post-conversion coordinates. Therefore, the coordinates c1(x, y), c2(x+1, y), c3(x, y+1), and c4(x+1, y+1) of four pixels of the conversion map table 30(*n*) are set to (1, 2), (2, 2), (1, 3), and (2, 3), respectively. In other words, the values of "x" and "y" are 1 and 2, respectively.

According to the bilinear method, in a case of deriving the coordinates C_p of P(x_r, y_r), when the fractional portions of the values "x_r" and "y_r" are represented by "x_s" and "y_s", the following expressions are satisfied.

$$d = c1 \times (1.0 - x\_s) + c2 \times x\_s \quad (1)$$

$$e = c3 \times (1.0 - x\_s) + c4 \times x\_s \quad (2)$$

$$C\_p = d \times (1.0 - y\_s) + e \times y\_s \quad (3)$$

The variable "d" represents an interpolation value of a point (x_r, y) between the coordinates "c1" and "c2", and the variable "e" represents an interpolation value of a point (x_r, y+1) between the coordinates "c3" and "c4", and the variable "C_p" is an interpolation value which is a coordinate of the desired element.

First, the x coordinates of the four point elements are considered. Since the value "x_r" between the values "x" (=1) and "x+1" (=2) is 1.8, the value "x_s" which is the fractional portion of the value "x_r" becomes 0.8. If 0.8 is substituted for the variable "x_s" of Expression (1), the variable "d" becomes 2.3 (=1.5×(1.0−0.8)+2.5×0.8).

Similarly, if 0.8 is substituted for the variable "x_s" of Expression (2), the variable "e" becomes 2.6 (=1.8×(1.0−0.8)+2.8×0.8). Meanwhile, since the value "y_r" between the values "y" (=2) and "y+1" (=3) is 2.3, the value "y_s" which is the fractional portion of the value "y_r" becomes 0.3. Therefore, the variable "C_p" of Expression (3) becomes 2.39 (=2.3×(1.0−0.3)+2.6×0.3).

Subsequently, the y coordinates of the four point elements are considered. In this case, the variable "d" of Expression (1) becomes 2.38 (=2.3×(1.0−0.8)+2.4×0.8). Similarly, the variable "e" of Expression (2) becomes 2.46 (=2.3×(1.0−0.8)+2.5×0.8). Therefore, the variable "C_p" of Expression (3) becomes 2.40 (=2.38×(1.0−0.3)+2.46×0.3).

If interpolation is performed on the x coordinates and y coordinates by the bilinear method as described above, the post-conversion coordinates of the coordinates (1.8, 2.3) become (2.39, 2.40) as shown in the lower part of FIG. 10. Similarly, linear coordinate interpolation is performed on the coordinates of four surrounding pixels of the conversion map table 30(*n*) corresponding to the coordinates (real numbers) of each element of the recording map table 31(*n*−1), whereby all elements of the recording map table 31(*n*−1) are updated with interpolation values. As a result, the recording map table 31(*n*) is obtained.

Subsequently, the CPU 17 returns to STEP S20 in which it performs curvature correction as image processing on the original image 20 based on the updated recording map table 31(*n*). Next, in STEP S22, the CPU outputs the processed image 20*a* obtained by performing curvature correction, and the mesh image 21 superimposed on the corresponding processed image, to the display unit 14.

Thereafter, in a case of "NO" in STEPS S24, STEPS S26 to S32 and STEPS S20 and S22, resetting of the mesh image 21, generating of a conversion map table 30, updating of the recording map table 31, the process of performing curvature correction on the original image 20 based on the recording map table 31, and outputting of the processed image 20*a* to the display unit 14 are repeated. These repetitive processes are repeatedly performed until the distortion of the processed image 20*a* obtained by curvature correction falls in the allowable range, that is, until it is determined that sufficient curvature correction has been performed.

Meanwhile, in a case where the processed image 20*a* satisfies the predetermined condition (STEP S24), in STEP S34, the CPU 17 saves the latest processed image 20*a* in the storage medium 16. Subsequently, in STEP S36, the CPU 17 determines whether there is any other image to be processed. In a case where there is another image to be process ("YES" in STEP S36), the CPU returns to STEP S14, and repeatedly performs the above described processes on the corresponding image. Meanwhile, in a case where there is no image to be processed ("NO" in STEP S36), the CPU finishes the corresponding process.

According to the present embodiment described above, based on the shape of the mesh image 21 deformed by user's touch operations, the CPU generates a conversion map table 30 containing information on the coordinates after curvature correction of the pixels constituting the original image 20. Also, based on the coordinates written in the conversion map table 30, the CPU updates the coordinates of the recording map table 31 containing information on the past conversion histories of the pixels constituting the image. Further, on the updated recording map table 31, the CPU performs curvature correction on the original image 20. By this process, it is possible to repeatedly and smoothly perform the correcting process without deteriorating the image.

Also, according to the present embodiment described above, the coordinates of the recording map table 31 used in the previous curvature correction is replaced with the corresponding pixel coordinates of the conversion map table 30, whereby the coordinates of the recording map table 31 are updated, and then curvature correction is performed on the original image 20. Therefore, it is possible to repeatedly and smoothly perform the correcting process without deteriorating the image.

Also, according to the present embodiment described above, on the occasion of the second or subsequent curvature correction, the processed image 20*a* obtained by curvature correction, and the mesh image 21 superimposed on the corresponding processed image 20*a* are displayed. Therefore, the user can repeatedly and smoothly perform the correcting process without stress.

Also, according to the present embodiment described above, curvature correction is performed by performing perspective conversion on the original image 20 based on the recording map table 31. Therefore, even in an information device, such as a tablet or a smart phone, which is not very superior in the processing capacity, it is possible to repeatedly and smoothly perform the correcting process.

Also, according to the present embodiment described above, the mesh image 21 is drawn by quartic Bezier curves, and the control points of the Bezier curves are moved by user's touch operations, whereby the mesh image 21 is deformed. Therefore, even in an information device, such as a tablet or a smart phone, which is not very superior in the processing capacity, it is possible to easily implement the process of deforming the mesh image 21, and it is possible to repeatedly and smoothly perform the correcting process.

Also, according to the present embodiment described above, perspective conversion (trapezoid correction) is used as the curvature correcting process. However, the curvature correcting process is not limited thereto. Trapezoid correction from two reference lines positioned at the upper and lower ends of an image, and correction on the curvature of each point in the longitudinal direction, and correction on the curvature of each point in the transverse direction may be performed.

Although some embodiments of the present invention have been described, the scope of the present invention is not limited to the above described embodiments, and includes the scopes of inventions disclosed in claims and the scopes of their equivalents.

Hereinafter, the inventions disclosed in the claims of this application will be appended.

What is claimed is:

1. An image correcting apparatus comprising:
  an input unit that receives instruction inputs from a user; and
  a processor that performs processes including:
    displaying an image to be processed, and a mesh image superimposed on said corresponding image, on a display device;
    deforming a shape of the mesh image based on the instruction inputs;
    generating a conversion matrix representing coordinates after curvature correction of pixels constituting the image to be processed, based on the deformed shape of the mesh image;
    updating a recording matrix representing conversion histories of pixels constituting an original image, based on the coordinates represented by the generated conversion matrix; and
    performing curvature correction on the original image based on the updated recording matrix.

2. The apparatus according to claim 1, wherein:
  in a second or subsequent curvature correction, the updating updates the recording matrix by replacing coordinates represented by a recording matrix used in a previous curvature correction with corresponding pixel coordinates representing in the conversion matrix.

3. The apparatus according to claim 1, wherein:
  in a second or subsequent curvature correction, the displaying displays a processed image obtained by the curvature correction and the mesh image superimposed on the corresponding processed image, on the display device.

4. The apparatus according to claim 1, wherein
  the performing performs the curvature correction by performing perspective conversion on the original image based on the updated recording matrix.

5. The apparatus according to claim 1, wherein:
  the displaying draws the mesh image by quartic Bezier curves; and
  the deforming deforms a shape of the mesh image by moving control points of the Bezier curves based on the instruction inputs.

6. An image correcting method comprising:
  displaying an image to be processed, and a mesh image superimposed on said corresponding image, on a display device;
  receiving instruction inputs from a user;
  deforming a shape of the mesh image based on the instruction inputs;
  generating a conversion matrix representing coordinates after curvature correction of pixels constituting the image to be processed, based on the deformed shape of the mesh image;
  updating a recording matrix representing conversion histories of pixels constituting an original image, based on the coordinates represented by the generated conversion matrix; and
  performing curvature correction on the original image based on the updated recording matrix.

7. The method according to claim 6, wherein: in a second or subsequent curvature correction, the updating updates the recording matrix by replacing coordinates represented by a recording matrix used in a previous curvature correction with corresponding pixel coordinates representing in the conversion matrix.

8. The method according to claim 6, wherein:
  in a second or subsequent curvature correction, the displaying displays a processed image obtained by the curvature correction and the mesh image superimposed on the corresponding processed image, on the display device.

9. The method according to claim 6, wherein
  the performing performs the curvature correction by performing perspective conversion on the original image based on the updated recording matrix.

10. The method according to claim 6, wherein:
  the displaying draws the mesh image by quartic Bezier curves; and
  the deforming deforms a shape of the mesh image by moving control points of the Bezier curves based on the instruction inputs.

11. A no-transitory computer-readable storage medium having stored thereon a program executable by a computer, the program controlling the computer to perform functions comprising:
  displaying an image to be processed, and a mesh image superimposed on said corresponding image, on a display device;
  receiving instruction inputs from a user;
  deforming a shape of the mesh image based on the instruction inputs;
  generating a conversion matrix representing coordinates after curvature correction of pixels constituting the image to be processed, based on the deformed shape of the mesh image;
  updating a recording matrix representing conversion histories of pixels constituting an original image, based on the coordinates represented by the generated conversion matrix; and
  performing curvature correction on the original image based on the updated recording matrix.

* * * * *